T. B. DIXON.
APPARATUS FOR MAKING VEGETABLE INFUSIONS OR EXTRACTS.
APPLICATION FILED JULY 11, 1913.
1,246,399.
Patented Nov. 13, 1917.
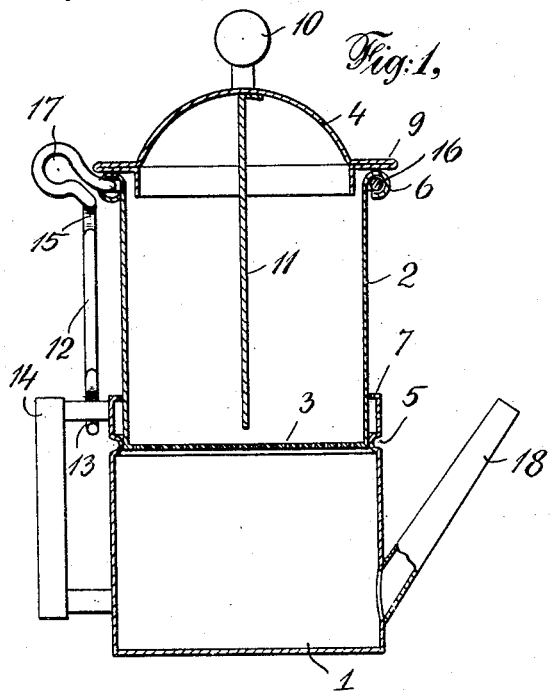
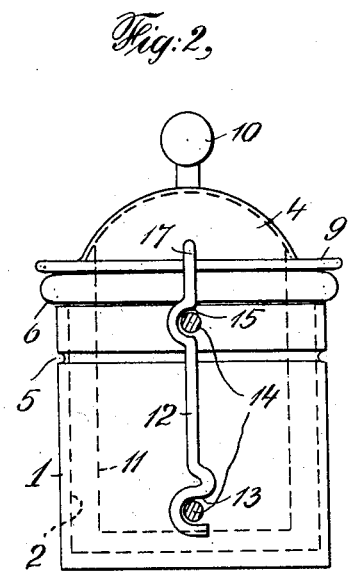
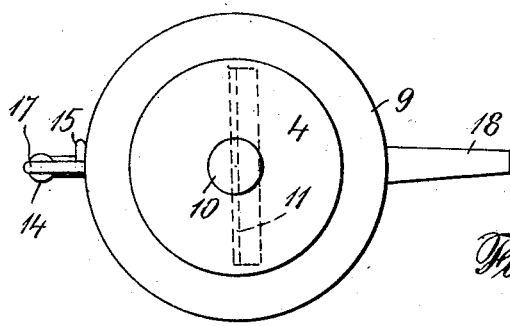
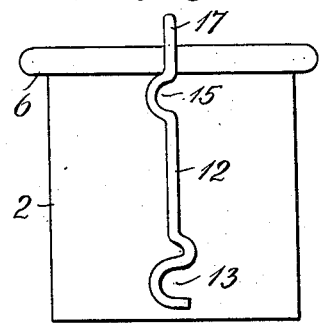
WITNESSES:
INVENTOR.
Thomas B. Dixon T. B. DIXON.
APPARATUS FOR MAKING VEGETABLE INFUSIONS OR EXTRACTS.
APPLICATION FILED JULY 11, 1913.
1,246,399.
Patented Nov. 13, 1917.
3 SHEETS—SHEET 2.
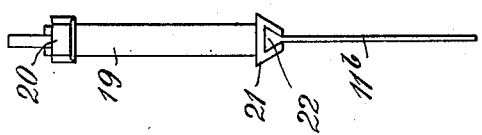
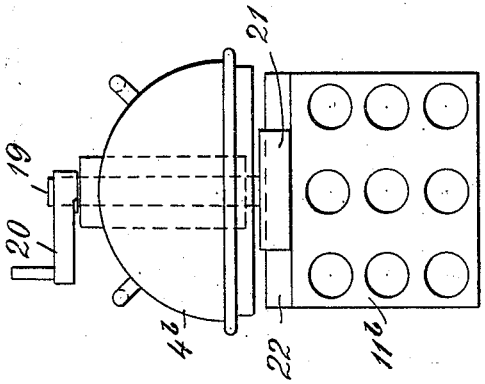
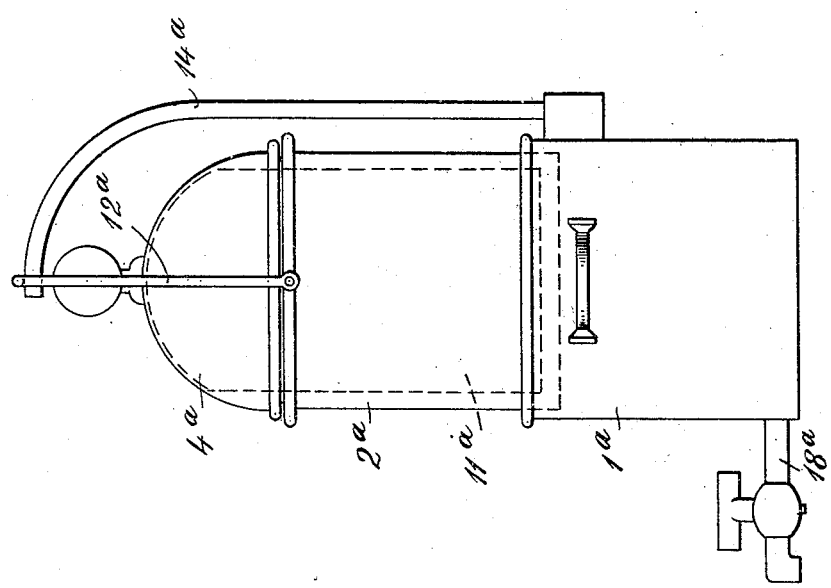
WITNESSES:
INVENTOR.
Thomas B. Dixon.

T. B. DIXON.
APPARATUS FOR MAKING VEGETABLE INFUSIONS OR EXTRACTS.
APPLICATION FILED JULY 11, 1913.
1,246,399.
Patented Nov. 13, 1917.
3 SHEETS—SHEET 3.
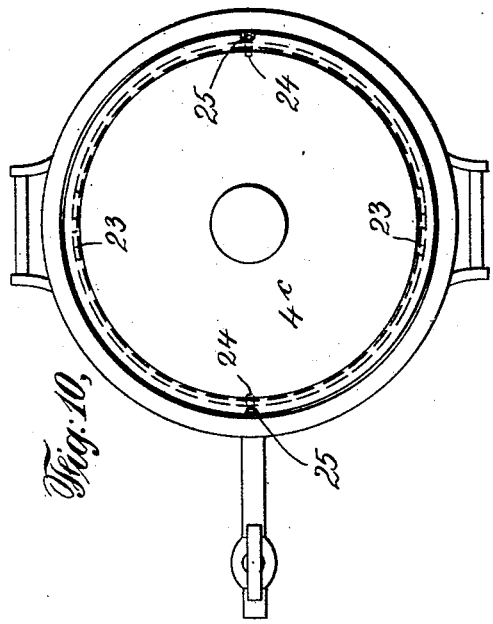
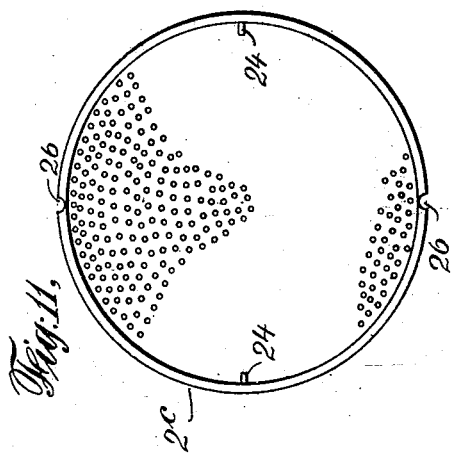
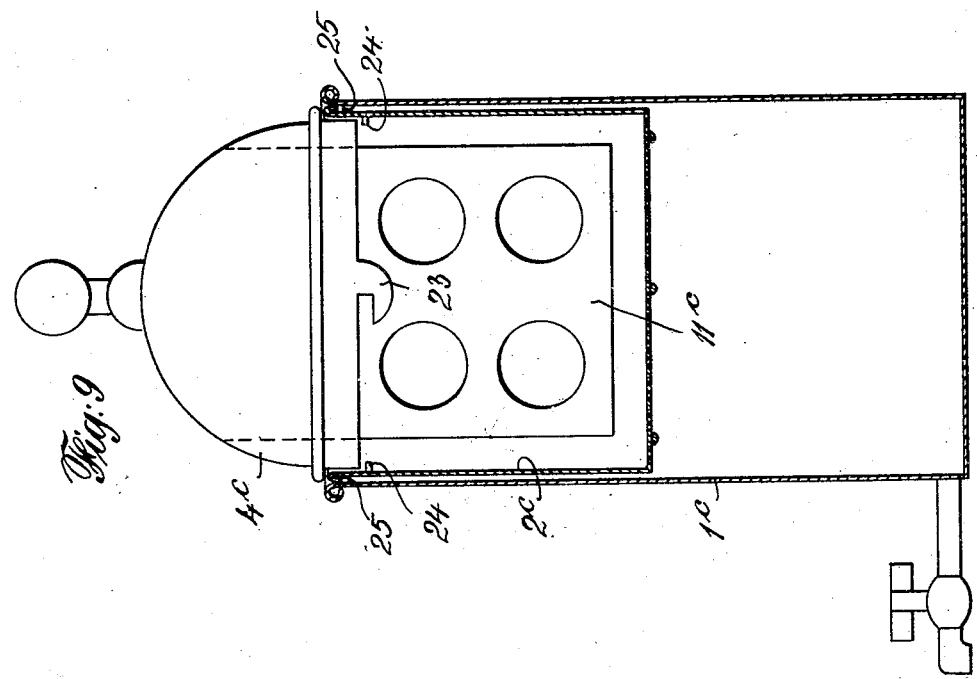
WITNESSES:
May I. Trimble
Paul H. Franke
INVENTOR.
Thomas B. Dixon

UNITED STATES PATENT OFFICE.

THOMAS BULLITT DIXON, OF NEW YORK, N. Y.

APPARATUS FOR MAKING VEGETABLE INFUSIONS OR EXTRACTS.

1,246,399.  Specification of Letters Patent.  Patented Nov. 13, 1917.

Application filed July 11, 1913. Serial No. 778,580.

*To all whom it may concern:*

Be it known that I, THOMAS B. DIXON, a citizen of the United States, residing at New York, in the county of New York and State of New York, have invented certain new and useful Apparatus for Making Vegetable Infusions or Extracts, of which the following is a specification.

My invention relates to apparatus for making vegetable infusions or extracts, particularly infusions or extracts from substances like tea and coffee, which infusions depend for their attractiveness, and, in large measure, for their value, upon the possession of certain delicate qualities of taste and odor. I have discovered that tea and coffee extracts are best made by thorough mixture of the tea or coffee and water in a closed vessel from which the more volatile and delicate constituents of the tea or coffee (which constituents have much to do with imparting to the resulting extract the desired flavor and aroma) cannot escape; such mixture being formed, preferably, at a pressure not exceeding ordinary atmospheric pressure, and at a temperature, preferably, less than 212 degrees Fahrenheit; the solid constituents of the mixture, *i. e.*, the tea or coffee "grounds", being removed mechanically from the liquid as soon as the extract has reached the desired strength, thereby avoiding prolonged contact of the said grounds with the liquid; for prolonged contact, if it occurs, is apt to result in a bitter and otherwise undesirable taste in the resulting extract, and a less delicate and desirable aroma. This extraction process, otherwise stated, comprises contacting and thoroughly mixing water and the solid substance, (tea or coffee, for example,) from which the extract is to be made, in a closed container from which the more volatile ingredients of such solid substance cannot escape materially, such contact and mixture occurring, preferably, at a pressure not greater than atmospheric pressure, and at a temperature approximating, but less than, 212 degrees Fahrenheit; continuing such contact and mixing until an extract of the desired strength has been formed, and then, and as soon as practicable, separating the remaining solid from the liquid under conditions such that the vapors above the liquid are not permitted to escape. The apparatus of my invention, in which this extraction process can be carried out, comprises a closed container provided internally with means for mechanically agitating together the liquid and the solid and also provided with means for separating the solid from the liquid without permitting appreciable or important escape of vapors from above the liquid; also structural features whereby both solid and liquid may be introduced into the container, and the container closed before contact of such solid with the liquid can occur; also other features, hereinafter set forth and particularly pointed out in the appended claims.

The objects of my invention are, to produce vegetable infusions or extracts, particularly infusions or extracts of tea and coffee, of superior quality and in a simple, rapid, and convenient manner; to avoid the loss of the more volatile and delicate flavor- and aroma-imparting ingredients of the tea or coffee; to provide a method whereby the tea and coffee may be substantially "exhausted" of the desirable ingredients, and may be used in an economical manner, without extracting from such tea or coffee too great a proportion of those ingredients of the tea and coffee which tend to impart undesirable taste and aroma to the extract; and to provide simple, inexpensive, and convenient apparatus for carrying out the said process.

I will now proceed to describe my invention with reference to the accompanying drawings, which are illustrative of certain embodiments of my invention and will then point out the novel features in claims. In said drawings:—

Figure 1 shows a central vertical section of a simple form of my infusion apparatus, the straining chamber thereof being shown in elevated position; Fig. 2 shows a rear elevation of such apparatus, the straining chamber being shown in depressed position; Fig. 3 shows a top view of the apparatus; Fig. 4 a rear elevation of the straining chamber itself, removed from the remainder of the apparatus; and Fig. 5 shows a side elevation of the top and stirrer-blade of the apparatus.

Fig. 6 shows a side elevation of another form of my infusion apparatus, particularly intended for use where somewhat greater capacity is desired; Fig. 7 shows a side elevation of alternative form of top and stirrer-blade; and Fig. 8 shows an end elevation of the stirrer blade of Fig. 7 and an elevation of the shaft for supporting and rotating said blade; this view showing particularly one means for connecting said shaft and blade.

Fig. 9 shows a side elevation and partial section of still another form of infusion apparatus, particularly intended for use when considerable capacity is desired; Fig. 10 shows a top view of the apparatus shown in Fig. 9; and Fig. 11 is a top view of the straining chamber of the apparatus shown in Fig. 9.

Referring first to Figs. 1 to 5 inclusive, 1 designates the main container of the apparatus there shown; 2 a straining vessel, adapted to move up and down in vessel 1, and having a strainer-bottom 3; and 4 designates a top for the straining vessel, constructed so as to be removable readily, but when in place to close the top of the straining vessel. Preferably, the relative sizes of vessels 1 and 2 are such that when vessel 2 is in its lowermost position vessel 1 is nearly filled by said vessel 2; there remaining, however, preferably, space between the said vessel to permit the escape of steam if any be formed. To guide vessel 2 in its motion I provide vessel 1 with suitable guiding means, as, for example, an inwardly projecting bead 5; the fit between this bead and vessel 2, though fairly close, being sufficiently loose to permit escape of any steam which may form in vessel 1. Vessel 2 is also provided with a projecting rim 6 which, when said vessel is in its lowermost position, rests on the rim 7 of vessel 1, substantially preventing the escape of vapors from vessel 1 when the pressure in vessel 1 is not above atmospheric pressure, yet sufficiently loose with respect to rim 7 to permit escape from vessel 1 of steam formed therein without material rise of pressure in vessel 1.

The top 4 is provided with a flange 9 adapted to rest on the top of vessel 2 and to form a reasonably tight joint therewith; this top 4 being, nevertheless, readily rotatable with respect to vessel 2; and this top is provided with a knob-handle, 10, by which it may be rotated conveniently, and with a depending stirring blade 11, extending nearly to the screen-bottom 3 of vessel 2. It will be obvious that by turning the top 4, thereby rotating the stirrer 11 within vessel 2 (such rotation is preferably alternately forward and back) the fluid contents of vessel 2 will be agitated thoroughly.

For convenience, I preferably provide means for supporting vessel 2 in its raised position, and for fastening it in its lowermost position; the particular means for the purpose, shown in the drawings, comprising a hook 12 having a notch 13 adapted, when vessel 2 is in elevated position, to engage the handle 14 of vessel 1 and hold vessel 2 elevated; while when the vessel 2 is in its lowermost position, said notch 13 engages the lower portion of handle 14, and another notch 15 of hook 12 engages the upper portion of handle 14, both notches 13 and 15 coöperating with the handle 14 to hold vessel 2 in its lowermost position. Hook 12 is shown as secured to vessel 2 by means of a ring 16, forming a part of said hook, and embracing the vessel 2. The structure comprising the hook 12 and ring 16 is further provided with a loop 17 forming a handle whereby the vessel 2 may be raised and lowered. It will be understood that in raising the vessel 2 from the position shown in Fig. 2, said vessel 2 is moved slightly to the left so as to disengage the hook 12 from the handle of the vessel 1, and then said vessel 2 is raised and, when raised to the proper position, is moved slightly to the right to reëngage the hook 12 with the handle 14 of vessel 1.

Vessel 1 may be provided with any suitable means for the discharge of liquid within it. I have illustrated for the purpose the ordinary spout 18.

The following is one manner of making infusions, in the apparatus shown in Figs. 1–5 inclusive:

The required amount of water is placed within vessel 1, such water either having been heated previously to the desired temperature (preferably a temperature slightly under 212° Fahrenheit) or being then heated to such temperature. Ground coffee or tea or other substance from which the fusion is to be made, is placed in the straining vessel 2, the cover to said straining vessel applied, and then the straining vessel is lowered into the main container 1 until the parts are in the position indicated in Fig. 2; and it will be clear that as vessel 2 is lowered into vessel 1 the water, heated to a suitable temperature, within vessel 1, will rise through the screen bottom of vessel 2 into the interior of that vessel, contacting with the coffee or tea or other material within that vessel 2. The top 4 and stirring blade 11 are then turned by means of the knob 10, thereby agitating thoroughly the mixture of heating liquid and solid materials within vessel 2; and such mixture and agitation may be produced more effectively by turning the blade 11 forward and back alternately rather than by turning it continuously forward. The effect of the operation of the stirring blade 11 is to mix very thoroughly the hot water and the tea or coffee, and such mixture facilitates greatly the extraction of the desired elements from the tea or coffee and also shortens greatly the time within which an extract of the desired strength is formed.

Preferably, the contents of the vessels 1 and 2 are not raised to the boiling point during the formation of this extract; but if the boiling point should be reached, and steam should be formed, such steam will escape between vessels 1 and 2, as previously explained. The cover 4 fits so closely on vessel 2, and vessel 2 fits so closely on vessel 1, that very little escape of volatile ingredients will take place provided the temperature be kept below the boiling point.

An infusion or extract of the desired strength having been formed, the straining vessel 2 is raised to its upper position, as shown in Fig. 1, the liquid extract running off rapidly through the screen bottom of vessel 2, while the solid material is retained, the separation of the solid from the liquid being thereby effected without opening either vessel 1 or vessel 2 and therefore without releasing the volatile ingredients which may be within the upper portion of vessel 2, and which it is desirable to retain.

The process as above described may be varied in several respects; for example the heated water may be poured into the vessel 2 and so into the vessel 1, while the vessel 2 is in its lowermost position, the coffee or tea being then poured onto the surface of the water, and the cover applied and the contents of the vessels stirred vigorously as previously described. In this way no appreciable portion of the more volatile ingredients will be lost prior to the application of the cover, since the coffee or tea, will, at first, float on the surface of the water, and will not become thoroughly moistened until the stirring or agitation begins. Or, the coffee or tea may be placed in the vessel 2 in the first instance, and water, preferably heated, poured into said vessel 2, the cover being then applied and the agitation begun. Also, cold water and the tea or coffee may be placed together in vessel 2, the latter being in its lower position, and the contents of the vessels being then heated and the agitation begun. However the process is carried out, the separation of the remaining solid matter from the extract should be effected by raising the vessel 2 and permitting the liquid to drain off from the solid contents of vessel 2, before the cover is removed.

In Fig. 6 I illustrate an alternative form of apparatus of general urn type; such apparatus comprising a main container 1ᵃ, a straining vessel 2ᵃ and a top 4ᵃ provided with a stirrer blade 11ᵃ. The vessel 2ᵃ is provided with a swinging handle 12ᵃ by which said vessel may be raised and lowered, and the vessel 1ᵃ is provided with a bracket 14ᵃ from which the handle 12ᵃ may be suspended. A faucet 18ᵃ is provided for drawing off the extract from vessel 1ᵃ when formed.

It is frequently desirable to perforate the stirring blade. Such a perforated stirring blade is illustrated in Fig. 7, wherein said blade is designated by reference character 11ᵇ. In apparatus of considerable capacity it is usually preferable to rotate the stirring blade with reference to the top or cover of the straining vessel, rather than to rotate the entire top or cover. Therefore, in Fig. 7 I have illustrated the said top or cover, there designated by numeral 4ᵇ, as provided with a bearing for a shaft 19, from which shaft the stirring blade 11ᵇ is suspended; and said shaft is also provided with a crank handle 20 whereby the shaft may be rotated. As a convenient means of attachment of the stirring blade to the shaft I have shown said shaft as provided, at its lower end, with a member 21 having a dovetail recess (see Fig. 8) and have shown the stirring blade as provided with a corresponding dovetail boss 22 at its upper end.

Figs. 9, 10, and 11, illustrate still another form of my apparatus comprising an outer vessel or main container, 1ᶜ, a strainer vessel 2ᶜ, and a top 4ᶜ, said top being provided with a perforate stirrer 11ᶜ. Said top or cover 4ᶜ is provided with one or more hooks 23, adapted to engage pins 24 carried by the strainer vessel 2ᶜ, whereby said top or cover 4ᶜ may be secured to the vessel 2ᶜ, or detached therefrom, as desired; and I have shown the outer vessel 1ᶜ as provided with pins 25, which pins support vessel 2ᶜ when the latter is in its uppermost position, the rim of vessel 2ᶜ and flange of the top 4ᶜ having notches 26 and 27 which when opposite pins 25, permit the vessel 2ᶜ to be lowered.

In this specification I have used the terms "infusion" and "extract" as synonyms one of the other.

In the various forms of apparatus herein illustrated and described, the cover for the straining vessel is also adapted to serve as a cover for the main containing vessel 1, 1ᵃ, etc., when the straining vessel has been removed completely from the said main containing vessel.

Also, the stirrer blades may be made detachable from top in any convenient manner, one detachable form being shown in Figs. 7 and 8 where the construction may be such as to permit boss 22 of blade 11ᵇ to slide out of piece 21. It is more or less desirable to provide detachable blades where the cover is employed for the container directly, the strainer having been removed at conclusion of process, since some particles of coffee grounds may adhere to blade.

What I claim is—

1. In infusion apparatus, the combination with a main containing vessel, and a straining vessel adapted to slide into and out of said containing vessel and having an upper and a lower position within the main containing vessel, of a cover for said straining vessel carrying a stirring blade and adapted to be turned about its vertical axis, a support for holding the straining vessel in place when in its upper or lower position, and a handle for lifting or lowering said straining vessel.

2. In infusion apparatus, the combination with a main containing vessel, of a straining vessel adapted to slide in and out of said containing vessel, a cover for said straining vessel adapted also to fit the containing vessel when the straining vessel is entirely removed, and a stirring blade attachable to and detachable from said cover.

In testimony whereof, I affix my signature, in the presence of two witnesses.

THOMAS BULLITT DIXON.

Witnesses:
 MAY I. TRIMBLE,
 PAUL H. FRANKE.

Copies of this patent may be obtained for five cents each, by addressing the "Commissioner of Patents, Washington, D. C."